US012334791B2

(12) United States Patent
Shim et al.

(10) Patent No.: US 12,334,791 B2
(45) Date of Patent: Jun. 17, 2025

(54) HORIZONTAL LINEAR-VIBRATION GENERATING APPARATUS

(71) Applicant: JAHWA ELECTRONICS CO., LTD., Cheongju-si (KR)

(72) Inventors: Soon Koo Shim, Cheongju-si (KR); Kyung Yang Jung, Jeungpyeong-gun (KR); Won Gook Lee, Jecheon-si (KR); Han Ho Yoo, Cheongju-si (KR); Seung Ki Kim, Jeungpyeong-gun (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 387 days.

(21) Appl. No.: 17/790,436

(22) PCT Filed: Dec. 30, 2020

(86) PCT No.: PCT/KR2020/019400
§ 371 (c)(1),
(2) Date: Nov. 21, 2022

(87) PCT Pub. No.: WO2021/137619
PCT Pub. Date: Jul. 8, 2021

(65) Prior Publication Data
US 2023/0112671 A1   Apr. 13, 2023

(30) Foreign Application Priority Data
Jan. 3, 2020   (KR) .................. 10-2020-0000907

(51) Int. Cl.
H02K 33/06   (2006.01)
(52) U.S. Cl.
CPC .................. H02K 33/06 (2013.01)

(58) Field of Classification Search
CPC ........ H02K 33/06; H02K 33/16; H02K 33/02; H02K 5/04; B06B 1/04; B06B 1/045; H01F 7/02; H04M 19/04; H04M 19/047
See application file for complete search history.

(56) References Cited

U.S. PATENT DOCUMENTS

2016/0013710 A1   1/2016   Dong
2017/0070131 A1   3/2017   Degner et al.

FOREIGN PATENT DOCUMENTS

JP   2010110128 A   *   5/2010
JP   2017077153 A       4/2017
(Continued)

OTHER PUBLICATIONS

English translation of KR-1431779-B1 (Year: 2014).*
(Continued)

*Primary Examiner* — Tulsidas C Patel
*Assistant Examiner* — Joshua Kiel M Rodriguez
(74) *Attorney, Agent, or Firm* — Maier & Maier, PLLC (57) ABSTRACT

A horizontal linear-vibration generating apparatus that includes: a case coupled to a bracket so as to provide mounting space therein; a stator mounted in the mounting space and including a coil-yoke unit electrically connected to a circuit substrate on the bracket; a vibrator having magnets corresponding to the coil-yoke unit and weighted bodies configured to amplify vibration and vibrating in a first direction with respect to the stator in the mounting space; and first and second springs correspondingly provided between the case and the vibrator and elastically supporting a shaking motion of the vibrator in the first direction with respect to the stator in the mounting space, at opposite sides of the vibrator, where the first spring and the second spring are integrally provided with first and second spring feet, respectively, for mounting the vibrator.

6 Claims, 10 Drawing Sheets

(56) References Cited

FOREIGN PATENT DOCUMENTS

| KR | 1431779 B1 * | 8/2014 |
| KR | 101431779 B1 | 8/2014 |
| KR | 101746090 B1 | 6/2017 |
| KR | 1020180000228 A | 1/2018 |
| KR | 101858969 B1 | 5/2018 |
| KR | 1020190092851 A | 8/2019 |
| KR | 1020190121098 A | 10/2019 |

OTHER PUBLICATIONS

English translation of JP-2010110128-A (Year: 2010).*
International Search Report issued on Apr. 6, 2021, in corresponding International Application No. PCT/KR2020/019400, 6 pages.
Office Action issued on Jun. 17, 2024, in corresponding Korean Application No. 10-2020-0000907, 12 pages.
Notice of Allowance issued on Aug. 29, 2024, in corresponding Korean Application No. 10-2020-0000907, 12 pages.

* cited by examiner

Sectional view taken along line C-C

Sectional view taken along line D-D

First direction

HORIZONTAL LINEAR-VIBRATION GENERATING APPARATUS

TECHNICAL FIELD

The present disclosure relates to a horizontal linear-vibration generating apparatus and, more particularly, to a horizontal linear-vibration generating apparatus configured to generate vibrations while a vibrator shakes in a horizontal direction by an interaction of an electric field generated by a coil and a magnetic field by a magnet.

BACKGROUND

In general, as a vibration generating apparatus used as a receiving device in a portable terminal, an eccentric rotational vibration generating apparatus has been commonly used. However, this technology does not guarantee a long lifespan, does not have responsiveness that is quick, and has limitations in implementing various vibration modes. Therefore, there is a problem in that such technology does not satisfy needs of consumers in a trend of rapidly popularizing touch-operated smartphones.

Accordingly, a linear-vibration generating apparatus configured to generate vibrations by linearly shaking a weighted body has been developed. The linear-vibration generating apparatus basically uses a primary vibration system, and the conventional linear-vibration generating apparatus has a mechanism that basically generates vibrations by shaking the weighted body in a horizontal direction with a force (Lorenz force) according to an interaction between an electric field generated by a coil and a magnetic field by a permanent magnet.

Figure 1:
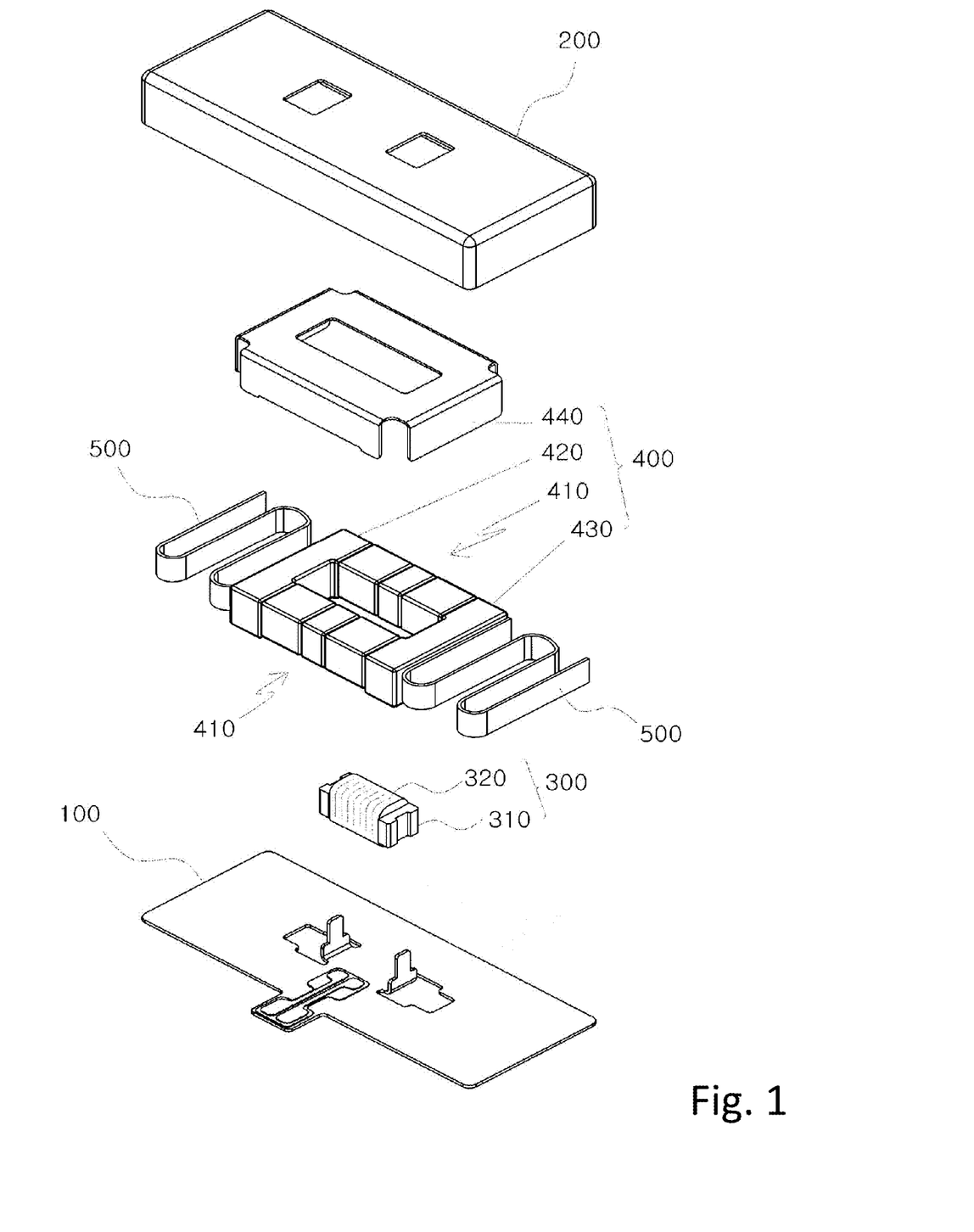
FIG. 1 is an exploded perspective view showing a typical example of a conventional linear-vibration generating apparatus.

FIG. 1 is an exploded perspective view showing a typical example of a conventional linear-vibration generating apparatus.

As in the example of FIG. 1, the conventional linear-vibration generating apparatus includes a stator 300 and a vibrator 400 vibrating with the stator 300 as a center. In addition, the conventional linear-vibration generating apparatus includes corrugated elastic bodies 500 provided to elastically support shaking in the horizontal direction of the vibrator 400 with respect to the stator 300 from opposite sides, a base 100 on which the stator 300 is mounted, and a cover 200 configured to be combined with the base 100.

The stator 300 includes a core 310 and a coil 320 surrounding the core 310, and the vibrator 400 includes: a pair of weighted bodies 420 and 430 spaced apart in a vibration direction; a pair of magnets 410 disposed to face each other in a direction perpendicular to the vibration direction with the stator 300 interposed between the pair of weighted bodies 420 and 430; and a frame 440 in which the pair of weighted bodies 420 and 430 and the pair of magnets 410 are mounted.

An alternating current is applied from a substrate (not shown) on the base 100 to the coil 320 constituting the stator 300. When the alternating current is applied to the coil 320, a force is generated due to the interaction between the magnetized coil 320 and the magnets 410, whereby the vibrator 400 vibrates according to frequency response characteristics predetermined by the elastic modulus of the weighted bodies 420 and 430 and the elastic bodies 500.

However, the conventional linear-vibration generating apparatus is a structure in which the pair of weighted bodies 420 and 430 and the pair of magnets 410 are mounted in the frame 440 and the elastic bodies 500 elastically support the frame 440 from the opposite sides and, and thus it is necessary to use a separate part (frame 440) for connecting the weighted bodies 420 and 430 and the magnets 410 to the elastic bodies 500. Therefore, it is a structure that is difficult to secure competitiveness in terms of miniaturization and production cost.

In addition, the elastic bodies 500 have to be respectively welded to opposite side portions of the frame 440 in which the weighted bodies 420 and 430 and the magnets 410 are mounted, so there are problems in that fatigue fractures or cracks easily occur in welding areas due to the accumulation of fatigue due to loads applied repeatedly during operation of the apparatus, and residual stress due to welding is also added, which greatly reduces durability.

On the other hand, the linear-vibration generating apparatus is generally provided with a stopper configured to limit the amplitude of the vibrator. A main function of the stopper is to prevent damage to key parts or the generation of abnormal noises and vibrations, which are caused by a vibrating body that vibrates out of a normal range of a vibration section due to resonance and overcurrent and collides with other adjacent components (for example, the cover 200 or the stator 300 in FIG. 1).

However, most of the conventional linear-vibration generating apparatuses use separate parts to configure the stopper, so there is a problem in that the overall number of parts constituting the apparatuses increases, as well as a decrease in mass production of the product and an increase in cost (production cost). In addition, more space is required to configure the stopper as a separate part, so there is a problem in that it is difficult to use the space efficiently, and it is difficult to implement the device in a compact size.

SUMMARY

Accordingly, the present disclosure has been made keeping in mind the above problems occurring in a related art, and a technical problem to be solved by the present disclosure is to provide a horizontal linear-vibration generating apparatus that does not need to configure a stopper using separate parts as in the related art by providing the stopper by effectively utilizing a part of a vibrator and a part of a stator.

Another technical problem to be solved by the present disclosure is to provide the horizontal linear-vibration generating apparatus that may exclude the use of a separate part (frame in FIG. 1) for connecting weighted bodies and magnets to an elastic bodies by integrally providing configurations (spring feet) for mounting the vibrator on the elastic bodies (springs), respectively.

Still another technical problem to be solved by the present disclosure is to provide the horizontal linear-vibration generating apparatus that may integrally provide the structures (spring feet) for mounting the vibrator thereon on the elastic bodies (springs), thereby solving a durability problem that occurs in the related art in which the elastic bodies had to be respectively welded to the sides of the vibrator.

Still another technical problem to be solved by the present disclosure is to provide the horizontal linear-vibration generating apparatus that exhibits improved vibration characteristics and response speed (responsiveness) by improving a magnetic circuit structure so that the magnetic force may be concentrated in a direction where the interaction between an electric field and a magnetic field is maximized.

In order to accomplish the above objectives, there may be provided a horizontal linear-vibration generating apparatus and according to an embodiment of the present disclosure, the apparatus including:

a case coupled to a bracket so as to provide mounting space therein;

a stator mounted in the mounting space and including a coil-yoke unit electrically connected to a circuit substrate on the bracket;

a vibrator having magnets corresponding to the coil-yoke unit and weighted bodies configured to amplify vibration and vibrating in a first direction with respect to the stator in the mounting space; and first and second springs correspondingly provided between the case and the vibrator and elastically supporting a shaking motion of the vibrator in the first direction with respect to the stator in the mounting space, at opposite sides of the vibrator, wherein the first and second springs are integrally provided with first and second spring feet, respectively, for mounting the vibrator, the first and second spring feet each have at least one movable stopper, the case and the bracket each have at least one fixed stopper provided in correspondence to the movable stopper, and the movable stopper and the fixed stopper corresponding to each other have at least portions overlapped when viewed in the first direction.

The vibrator applied to the present disclosure may include: first and second weighted bodies installed to face each other in the first direction with the coil-yoke unit interposed therebetween; and first and second magnets installed to face each other in a second direction orthogonal to the first direction with the coil-yoke unit interposed therebetween.

At this time, the first spring foot may be mounted with a first weighted body and a first magnet, thereon, and the second spring foot is mounted with a second weighted body and a second magnet, thereon.

In addition, one surface of the first weighted body may be fixed to an inner end of the first spring at a boundary part between the first spring and the first spring foot with spot welding or an adhesive, and one surface of the second weighted body may be fixed to an inner end of the second spring at a boundary part between the second spring and the second spring foot with spot welding or an adhesive.

In order for the first magnet and the second magnet not to be breakaway in the first direction during the vibration, the first spring foot and the second spring foot may be each provided with a pair of separation prevention pieces.

At this time, the pair of separation prevention pieces may be provided by cutting some parts of a magnet mounting plate of each of the first spring foot and the second spring foot and bending the cut-out portions in a direction in which the magnet is mounted.

Differently from this, the pair of separation prevention pieces may be provided such that opposite end some parts of each of an upper side plate and a lower side plate of each of the first and second spring feet are cut, and cut-out portions are bent in a direction in which the magnet is mounted.

In addition, the first and second magnets each may include: one central magnet; and a pair of auxiliary magnets installed to be in contact with and at opposite sides of the central magnet, wherein the central magnet of the first magnet and the central magnet of the second magnet each may have an N pole on one side close to the coil-yoke unit and an S pole on an opposite side far from the coil-yoke unit, the pair of auxiliary magnets installed to be in contact with and at opposite sides of each central magnet may each be provided such that a side in contact with the central magnet is an N pole, and a side far from the central magnet is an S pole, and magnetic pole surfaces where the pair of auxiliary magnets disposed in contact with the opposite sides of the one central magnet, and the central magnet may be brought in contact with each other are each inclined.

In this case, the central magnet may be provided in a shape of an isosceles triangle or an isosceles trapezoid, so a distance between corresponding two portions, each being equally apart from the coil-yoke unit, of the pair of magnetic pole surfaces, may narrow gradually as a distance of each of the two portions from the coil-yoke unit increases, wherein the pair of magnetic pole surfaces are provided by the auxiliary magnets respectively in contact with opposite sides of the central magnet.

In addition, the movable stoppers applied to the present disclosure may be provided such that one movable stopper is provided at each of an upper end and a lower end of one side and at each of an upper end and a lower end of an opposite side, of each of the first spring foot and the second spring foot, and the fixed stoppers may be provided in the case and the bracket so as to correspond to each of the movable stoppers one by one.

Here, the movable stoppers may be provided such that a plurality of stopper blades, provided one at each of opposite ends of each of an upper side plate and a lower side plate of each of the first and second spring feet, is each bent by approximately 90 degrees in the direction of the case or the bracket, and the fixed stoppers may be provided such that some parts of the case and the bracket at positions corresponding to the respective movable stoppers are cut, and the cut-out portions are bent by approximately 90 degrees in the direction of the mounting space.

In addition, at an initial neutral position of the vibrator in which the elasticity of the first spring and the second spring is balanced, a distance D1 between the movable stoppers and the fixed stoppers corresponding to the movable stoppers may be smaller than at least a shortest distance D2 between the coil-yoke unit and the weighted bodies.

According to above embodiments of the present disclosure, a stopper is configured by effectively utilizing a part of a vibrator and a part of a stator, whereby problems caused by constructing the stopper with separate parts as in the past (increase in the number of parts, decrease in mass production of a product, increase in production cost of a product, decrease in space utilization, a problem difficult to implement an apparatus with a compact size, and the like) can be solved.

In addition, configurations (spring feet) capable of mounting weighted bodies and magnets are integrally added to elastic bodies (springs), respectively, so the use of separate parts such as a conventional frame for connecting the weighted bodies and the magnets to the elastic bodies can be eliminated. Accordingly, product miniaturization and productivity improvement can be promoted, and the production cost can be lowered as much as the use of separate parts is excluded, thereby securing price competitiveness.

In addition, the configurations (spring feet) configured to mount the vibrator are integrally provided on the elastic bodies (springs), respectively, so there are advantages in that the bonding force between the elastic bodies and the vibrator is further increased, and a durability problem of the related art due to welding the elastic bodies and the vibrator can also be clearly solved.

In addition, even when the vibrator is over-stroked by a drop impact and the like, a direct collision between the vibrator and a coil-yoke unit is prevented by a pair of stoppers, so it is possible to fundamentally prevent abnormal noises and vibrations caused by a collision between parts (vibrator and coil-yoke unit) due to the drop impact and the like and damage to a key component (for example, coil-yoke unit) constituting the apparatus.

In addition, some parts of the spring feet and some parts of a case and a bracket are bent to face each other so as to provide movable stoppers and fixed stoppers, so an air gap between the vibrator and case and an air gap between the vibrator and bracket are reduced, and the air resistance decreases as much as the air gaps have been reduced when the vibrator moves in one direction. As a result, the influence of the air resistance caused by the air gaps on the vibration characteristics of the vibrator can be greatly reduced.

In addition, the present disclosure has advantages: the first and second magnets are structures respectively facing the opposite side surfaces of the stator and receiving the force, so the section from which the vibrator receives the force is provided long to make the vibration characteristics be exhibited well; and due to the magnetic circuit characteristics (characteristics that the magnetic force of the side facing the coil is increased) according to a unique arrangement of the permanent magnets, larger vibrations may be generated and the reaction speed (responsiveness) is also fast.

DETAILED DESCRIPTION OF THE EMBODIMENTS

Hereinafter, an exemplary embodiment of the present disclosure will be described in detail with reference to accompanying drawings.

Terms used in the specification are used only to describe specific embodiments and are not intended to limit the present disclosure. A singular expression includes a plural expression unless the context clearly dictates otherwise.

In the present specification, terms such as "comprise" or "have" are intended to designate that a feature, number, step, operation, component, part, or a combination thereof described in the specification exists but should be understood not to preclude in advance the possibility of the existence or addition of one or more other features numbers, steps, operations, components, parts, or combinations thereof.

In addition, terms such as first and second may be used to describe various elements, but the components should not be limited by the terms. The above terms are used only for the purpose of distinguishing one component from another.

Furthermore, terms such as " . . . part", " . . . unit", " . . . module", and the like described in the specification mean a unit that processes at least one function or operation, the unit being implemented by hardware or software or a combination of hardware and software.

In addition, in the description of the present disclosure, a term "substantially" should be understood to the extent that the recited properties, parameters, or values do not need to be precisely achieved, and that deviations, changes, or characteristics including tolerances, measurement errors, limits of measurement accuracy, and other factors known to those skilled in the art do not exclude an effect intended to be provided.

The present embodiments to be described below are applied to "portable user equipment", and a portable terminal refers to the portable user equipment. However, this is only a general term, and it is noted that the present embodiment may be applicable to various devices or fields of a mobile phone, a palm sized personal computer (PC), a personal communication system (PCS), a personal digital assistant (PDA), a Hand-held PC (HPC:), a smartphone, a wireless Local Area Network (LAN) terminal, a laptop computer, a netbook, a tablet personal computer, a non-mobile game console, a Virtual Reality (VR) device, a vehicle, and the like.

Therefore, the use of the term "portable user equipment" should not be used to limit the application of the present embodiment to a specific type of device.

Hereinafter, in the description with reference to the accompanying drawings, the same reference numerals will be assigned to the same components for the same drawings, and the overlapping description thereof will be omitted. In the description of the present disclosure, when it is determined that a detailed description of a related known technology may unnecessarily obfuscate the gist of the present disclosure, the detailed description thereof will be omitted.

Before describing the present disclosure, direction-related terms to be used later will be defined as follows. Of the directional terms used hereinafter, a first direction is defined as a longitudinal direction of the vibration generating apparatus in the drawing, more specifically, the direction in which the vibrator vibrates with respect to the stator, and a second direction is defined as a width direction orthogonal to the first direction on the same plane.

Figure 2:
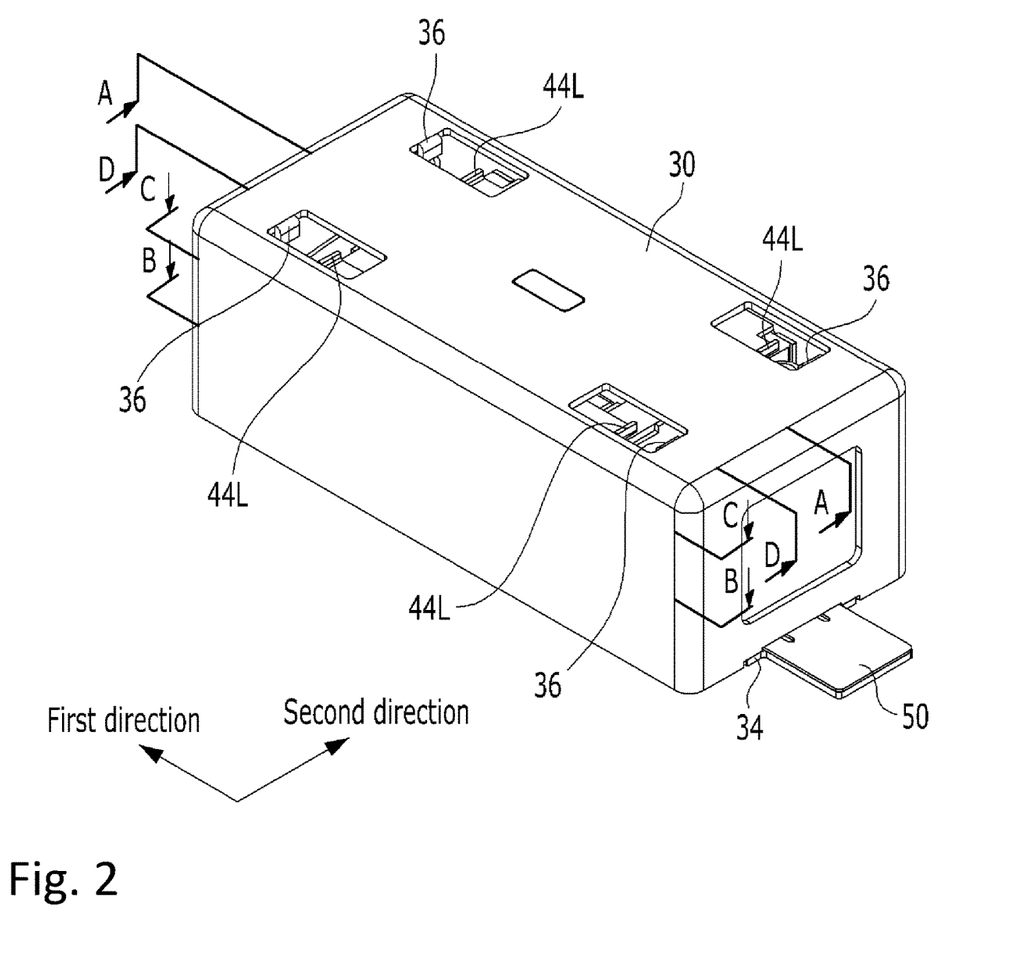
FIG. 2 is a perspective view of a horizontal linear-vibration generating apparatus according to an embodiment of the present disclosure.
Figure 3:
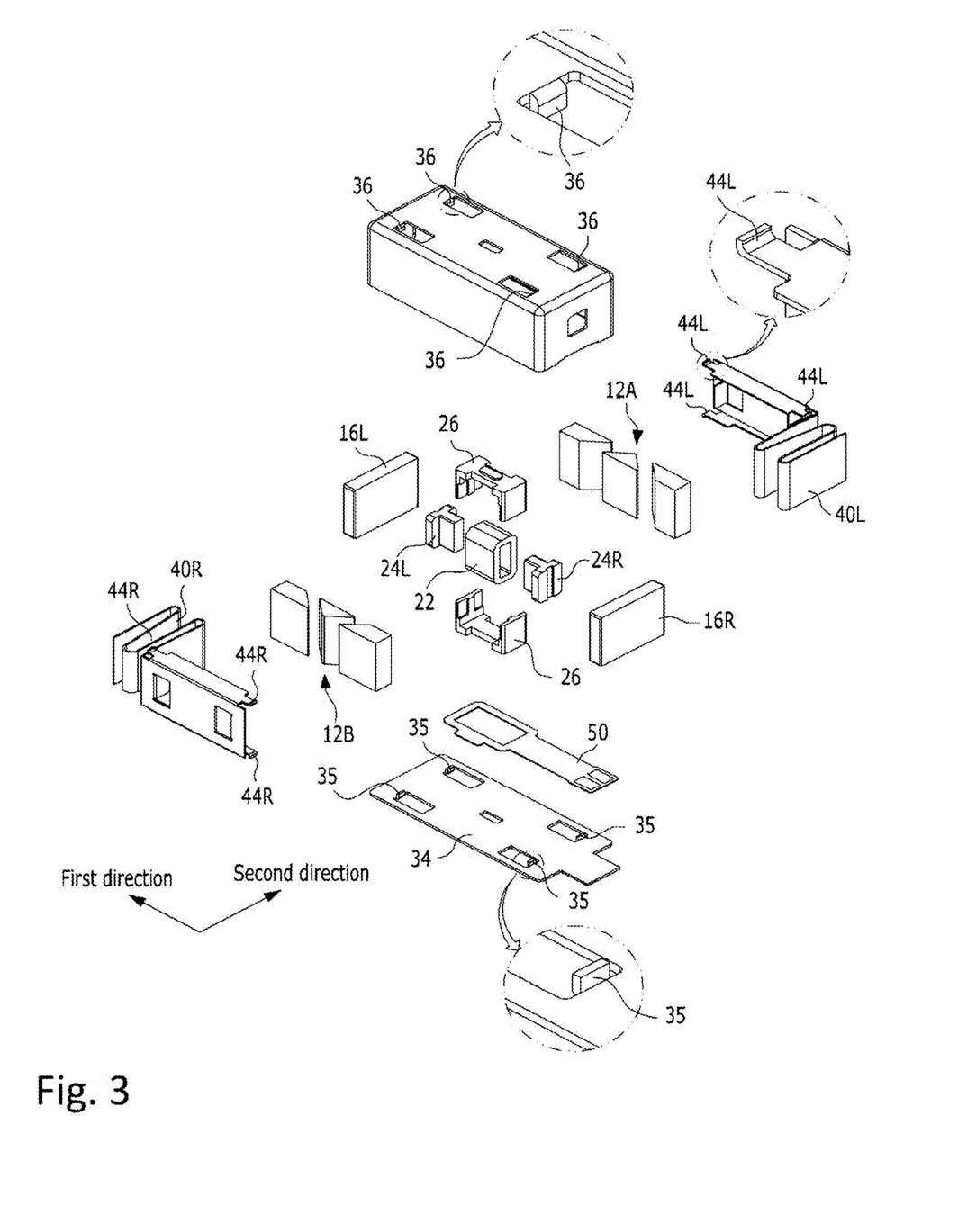
FIG. 3 is an exploded perspective view of the horizontal linear-vibration generating apparatus according to the embodiment of the present disclosure.
Figure 4:
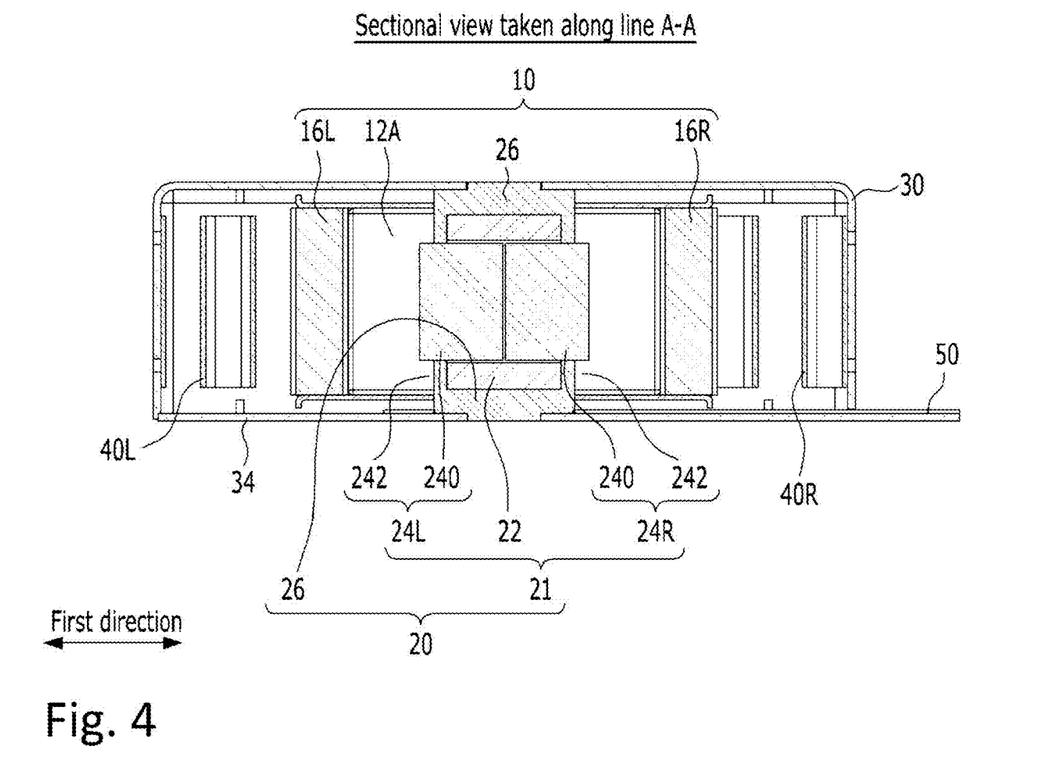
FIG. 4 is a sectional view of the horizontal linear-vibration generating apparatus of FIG. 2 as viewed taken along a line A-A direction.
Figure 5:
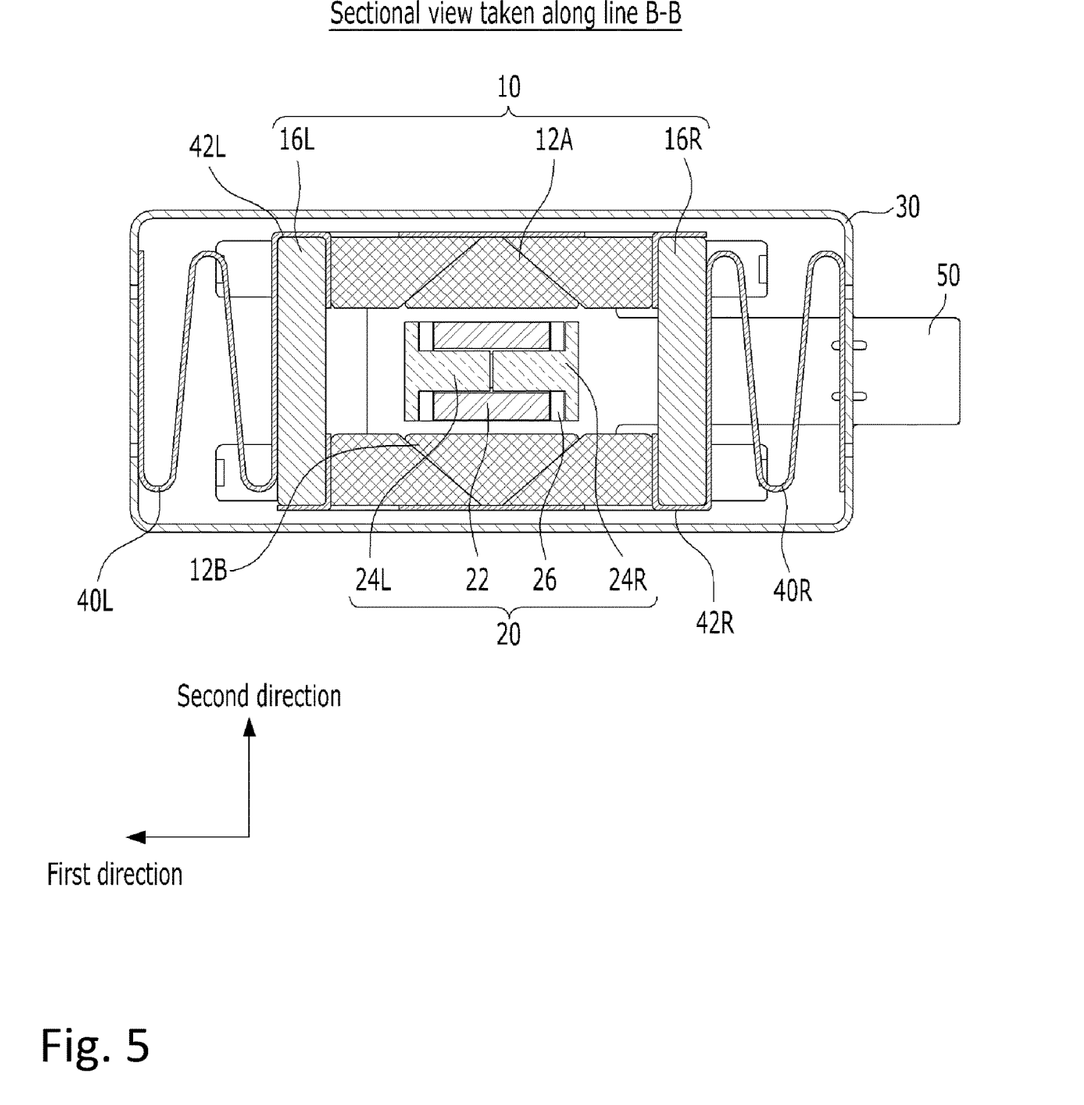
FIG. 5 is a sectional view of the horizontal linear-vibration generating apparatus of FIG. 2 as viewed taken along a line B-B direction.

FIG. 2 is a perspective view of a horizontal linear-vibration generating apparatus according to the embodiment of the present disclosure and FIG. 3 is an exploded perspective view of the horizontal linear-vibration generating apparatus according to the embodiment of the present disclosure. In addition, FIG. 4 is a sectional view of the horizontal linear-vibration generating apparatus of FIG. 2 as viewed taken along a line A-A direction, and FIG. 5 is a sectional view of the horizontal linear-vibration generating apparatus of FIG. 2 as viewed taken along a line B-B direction.

With reference to FIGS. 2 to 5, the horizontal linear-vibration generating apparatus according to the embodiment of the present disclosure may largely include a vibrator 10 and a stator 20. Here, the vibrator 10 and the stator 20 are relative concepts from one another, wherein the stator 20 means a part fixed with respect to the vibrator 10, and the vibrator 10 means a part vibrating with respect to the stator 20.

The vibrator 10 is installed in a case 30 constituting an outer appearance of the apparatus and performs a linear motion in which a movement direction is periodically changed with respect to the first direction by an interaction with the stator 20. First and second springs 40L and 40R, configured to elastically support the linear motion in the first direction of the vibrator 10 whose movement direction is periodically changed, are respectively interposed between the vibrator 10 and the case 30.

As exemplified in the drawings, the case 30 may have a rectangular shape in a planar shape having a long length in the first direction compared to the width in the second direction and may have a cuboid structure with an open lower portion, and a bracket 34 is coupled to the lower portion of the open case. Mounting space is provided inside by the case 30 and the bracket 34 coupled thereunder, and the vibrator 10, the stator 20, and the springs 40L and 40R are mounted in the mounting space thus provided.

The stator 20 is mounted on the bracket 34 and fixed to be located in a center of the mounting space, and a circuit substrate 50 configured to supply an alternating current from the outside to the coil 22 is disposed on an upper surface of the bracket 34 between the bracket 34 and the stator 20, wherein the coil 22, constituting a coil-yoke unit 21, is provided to generate vibration due to the interaction between the magnets 12A and 12B constituting the vibrator 10 and the coil-yoke unit 21 of the stator 20.

The stator 20 includes the coil-yoke unit 21. In addition, the coil-yoke unit 21 includes a coil 22 electrically connected to the circuit substrate 50 on the upper surface of the bracket 34 and yokes 24L and 24R configured to be surrounded by the coil 22 for a part of the outer surface thereof. In this case, the yokes 24L and 24R may be composed of a pair so as to be disposed to be opposite to each other with the coil 22 as a center with respect to the first direction.

The yokes 24L and 24R may each include a yoke core 240 surrounded by a coil 22 and a yoke end 242 that partitions a winding region of the coil 22. In addition, the coil-yoke unit 21 composed of a pair of yokes 24L and 24R is installed to be located in the center of the mounting space provided by the case 30 and the bracket 34 in a state of being floated from the bracket 34 by a coil guide 26.

As exemplified in the drawings, the coil guide 26 has a configuration divided into two upper and lower parts, and the upper part and the lower parts of the coil guide divided into two may be configured to be fixed, with coupling structures of protrusions-holes (numerals omitted), to a central part of the upper surface of the case 30 and a central part of the bracket 34, respectively.

The yokes 24L and 24R serve to focus in one direction lines of magnetic force generated when a current is applied to the coil 22. In addition, the coil 22 is magnetized to an N pole and an S pole alternately according to the power, specifically, the direction of the alternating current applied to the coil 22. Accordingly, vibration is generated due to the interaction (attractive and repulsive forces) between the coil-yoke unit 21 which is alternately magnetized to the N pole and the S pole and the first and second magnets 12A and 12B to be described later.

The vibrator 10 includes magnets and weighted bodies corresponding to the coil-yoke unit 21. Specifically, the weighted bodies may consist of first and second weighted bodies 16L and 16R disposed opposite to each other in the first direction with the coil-yoke unit 21 interposed therebetween, and the magnets may consist of first and second magnets 12A and 12B positioned in parallel with the coil-yoke unit 21 on opposite sides of the coil-yoke unit, that is, disposed opposite to each other in the second direction with the coil-yoke unit 21 interposed therebetween.

The first and second springs 40L and 40R are installed between the case 30 and the vibrator 10. As mentioned above, the first and second springs 40L and 40R elastically support shaking in the first direction of the vibrator 10 at the opposite sides with respect to the stator 20 and generate a restoring force to return the vibrator 10 to an initial neutral position by being compressed and extended when the apparatus is operated. In addition, the first and second springs also serve to limit amplitude of the vibrator 10 to a predetermined distance.

The first and second springs 40L and 40R are integrally provided with first and second spring feet 42L and 42R, respectively. The two spring feet 42L and 42R are arranged to face each other with respect to the second direction with the coil-yoke unit 21 interposed therebetween and respectively extend in directions to the springs on opposite sides along the first direction, and the vibrator 10 is accommodated in rectangular storage space defined by the first spring 40L and the first spring foot 42L and the second spring 40R and the second spring foot 42R.

The first spring foot 42L and the second spring foot 42R are each coupled to the vibrator 10 in the form of enclosing a portion of one corresponding side surface and a portion of a corresponding opposite side surface of the vibrator 10 in the second direction. In this case, a portion of the vibrator 10 may be coupled to the spring feet 42L and 42R in a structure in which the first weighted body 16L and the first magnet 12A are mounted on the first spring foot 42L, and the second weighted body 16R and the second magnet 12B are mounted on the second spring foot 42R.

One surface of the first weighted body 16L may be fixed to an inner end of the first spring 40L at a boundary part between the first spring 40L and the first spring foot 42L through spot welding or an adhesive. Similarly, one surface of the second weighted body 16R may be fixed to an inner end of the second spring 40R at a boundary part between the second spring 40R and the second spring foot 42R through spot welding or an adhesive.

Figure 6:
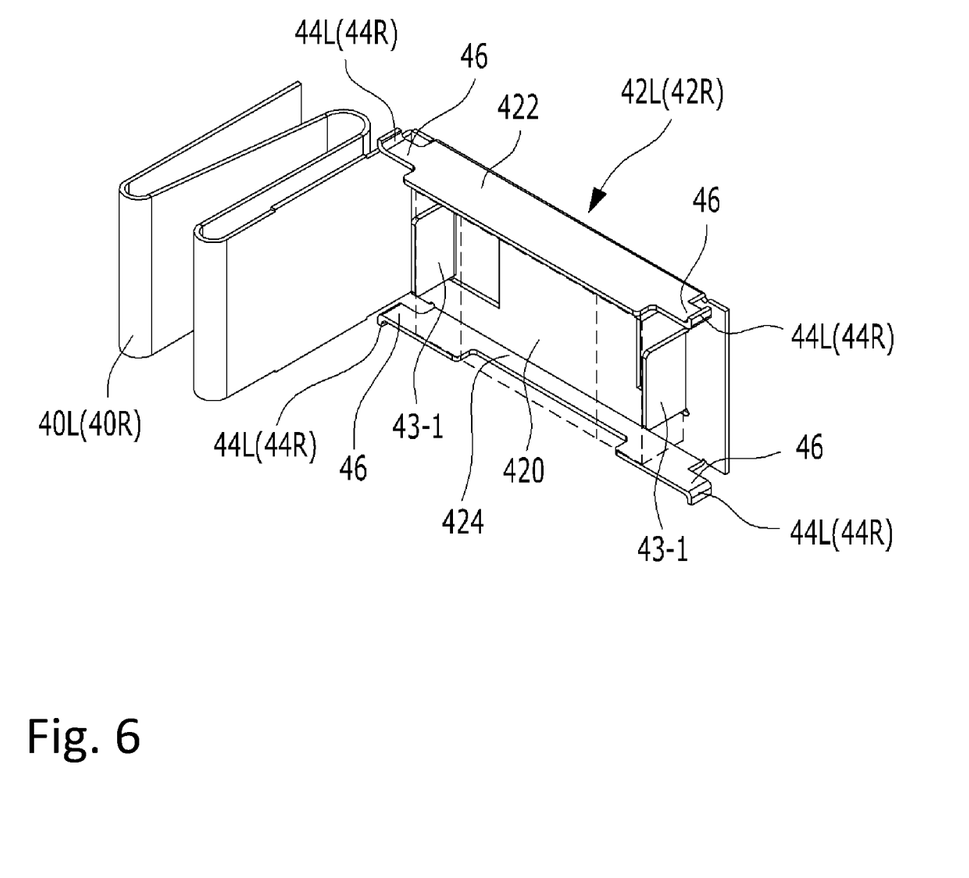
FIG. 6 is an enlarged perspective view of the spring of FIG. 2 integrally provided with a spring foot.

FIG. 6 is an enlarged perspective view of the spring integrally provided with a spring foot.

As shown in FIG. 6, the first and second spring feet 42L and 42R integrally provided on the first and second springs 40L and 40R, respectively, are each provided with a pair of separation prevention pieces 43-1. The separation prevention pieces 43-1 composed of the pair on each of the spring feet serve to restrain the corresponding magnet 12A or 12B mounted on each of the spring feet not to deviate in the direction of vibration when the vibrator 10 vibrates in the first direction with respect to the stator 20.

In addition, the separation prevention pieces 43-1 also serve as assembly guides configured to guide the corresponding magnet 12A or 12B to be accurately mounted at a predetermined mounting position. Such separation prevention pieces 43-1 may be provided in a batch formation through a punching or pressing process, in which some parts of the magnet mounting plate 420 of each of the first spring foot 42L and the second spring foot 42R are cut, whereby cut-out portions are bent at approximately 90 degrees in a direction in which the magnet is mounted.

Figure 7:
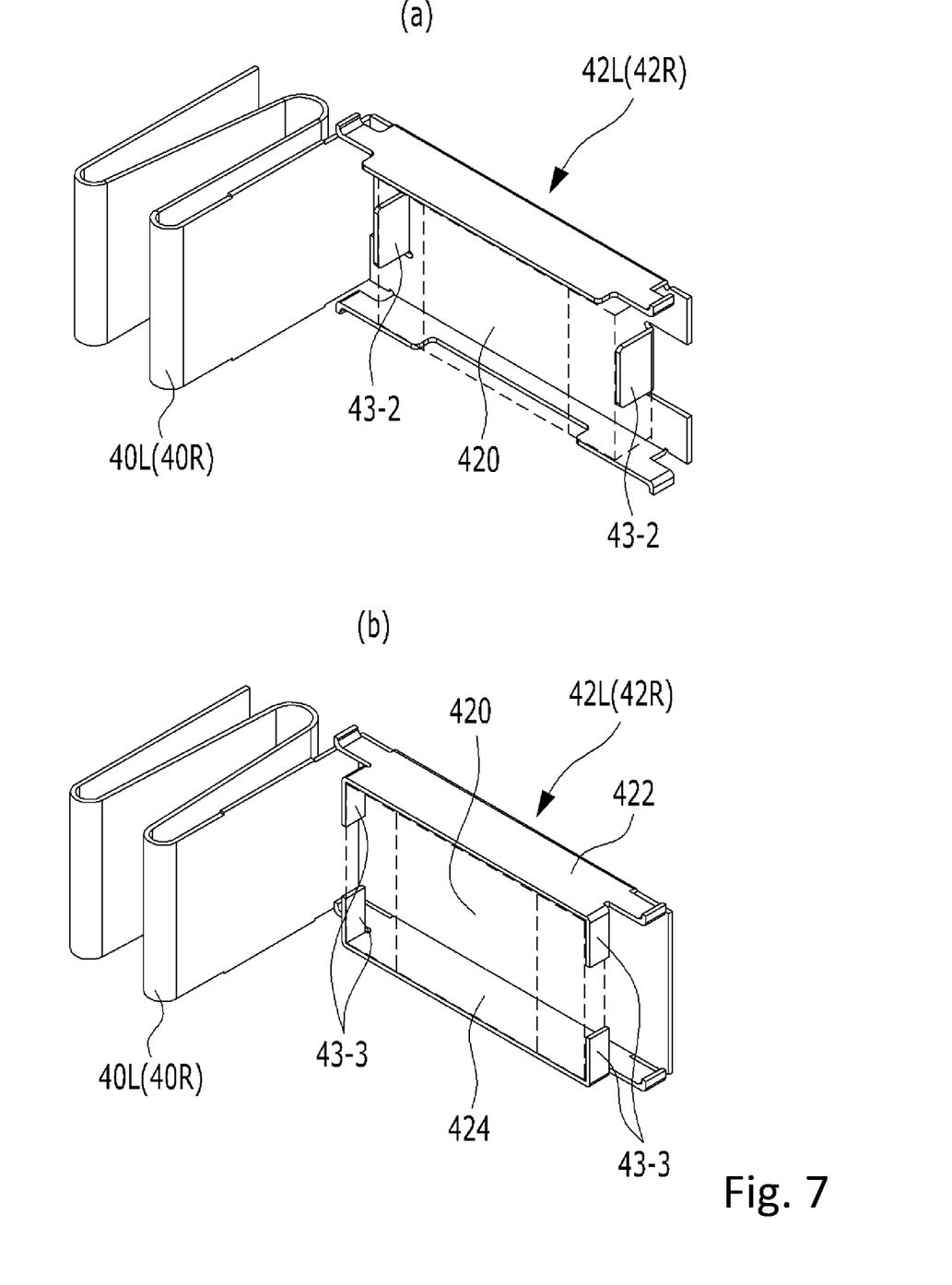
FIG. 7 illustrates views each showing a modified example of the spring integrally provided with the spring foot.

FIGS. 7a and 7b are views each showing a modified example of the spring integrally provided with the spring foot.

As shown in FIG. 7a, separation prevention pieces 43-2 may also be changed to a form in which some parts of opposite edges of the magnet mounting plate 420 of each of the first spring foot 42L and the second spring foot 42R are cut, whereby cut-out portions are bent at approximately 90 degrees in a direction in which the magnet is mounted. In addition, as shown in as shown in FIG. 7b, both ends (43-3) of the upper side plate 422 and the lower side plate 424 of the first and second spring feet 42L and 42R are cut and the cut portion is bent in a direction in which the magnet is mounted.

Figure 8:
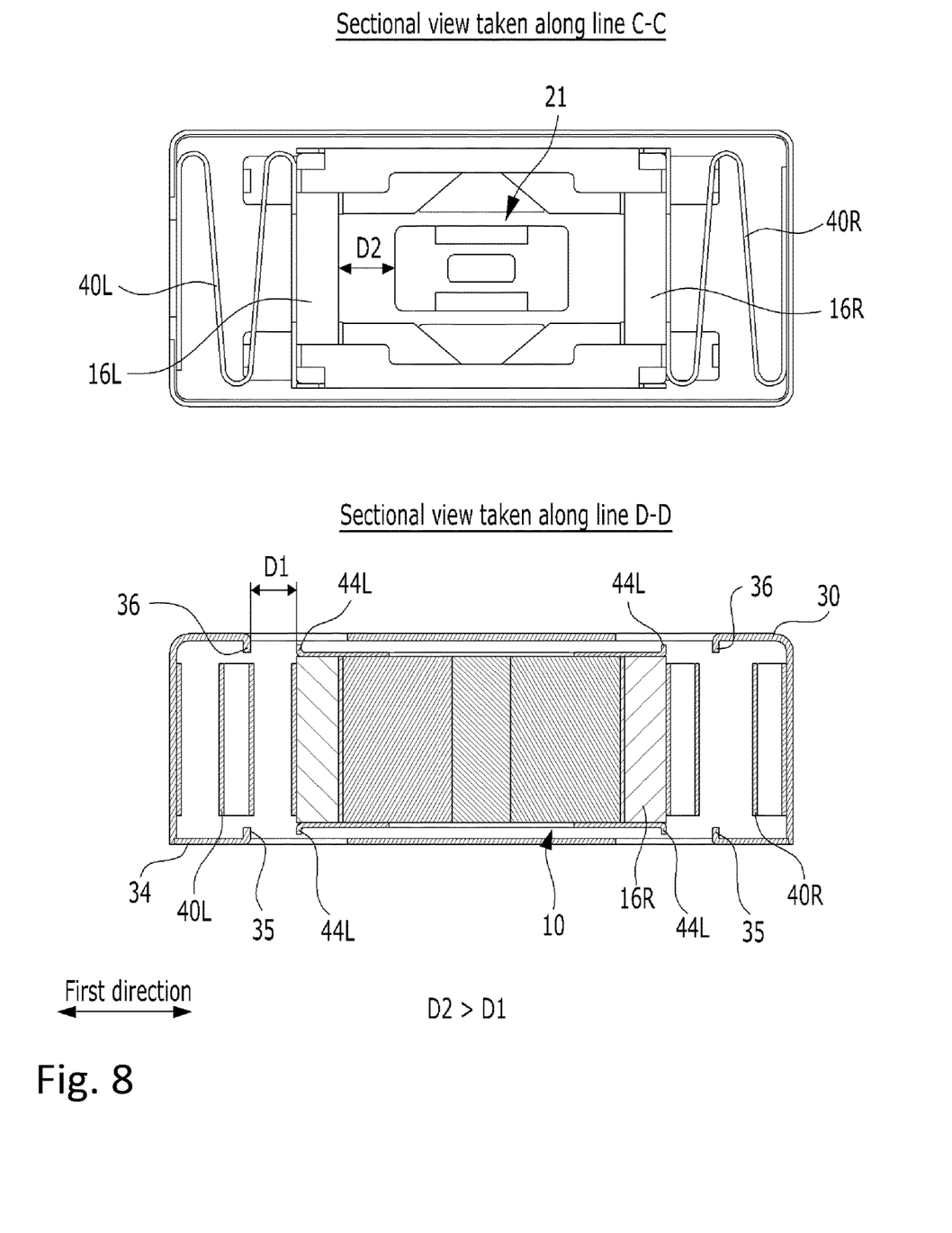
FIG. 8 shows sectional views of the horizontal linear-vibration generating apparatus of FIG. 2 as viewed taken along a C-C line direction and a D-D line direction, respectively.

FIG. 8 shows sectional views of the horizontal linear-vibration generating apparatus of FIG. 2 as viewed taken along a C-C line direction and a D-D line direction, respectively.

With reference to FIG. 8 and the preceding FIGS. 3 and 6 together, at least one movable stopper 44L or 44R is provided on a corresponding one of the first and second spring feet 42L and 42R. In addition, at least one fixed stopper 35 or 36 is provided in a corresponding one of the case 30 and the bracket 34 to correspond to the movable stoppers 44L or 44R. In this case, the movable stoppers 44L and 44R and the fixed stoppers 35 and 36 respectively corresponding to each other are configured to have at least portions overlapped when viewed in the first direction.

The movable stoppers 44L and 44R may be configured in a total number of eight movable stoppers with a structure having one movable stopper provided at each of an upper end and a lower end of one side and at each of an upper end and a lower end of an opposite side, of each of the first spring foot 42L and the second spring foot 42R. In addition, the case 30 and the bracket 34 may each include four fixed stoppers 35 or 36 so as to correspond to each of the eight movable stoppers 44L and 44R, respectively, as described above.

The movable stoppers 44L and 44R may be configured such that a plurality of stopper blades 46, provided one at each of opposite ends of an upper side plate 422 and a lower side plate 424 of each of the first and second spring feet 42L and 42R, is each bent by approximately 90 degrees in the directions of the case 30 or the bracket 34. In addition, the fixed stoppers 35 and 36 may be configured such that some parts of the case 30 and the bracket 34 at positions corresponding to the respective movable stoppers 44L and 44R are cut, and the cut-out portions are bent by approximately 90 degrees in the direction of the mounting space.

As such, when the movable stoppers 44L and 44R and the fixed stoppers 35 and 36 are configured by bending some parts of the spring feet and some parts of the case 30 and the bracket 34 to face each other, an air gap between the vibrator 10 and the case 30 and an air gap between the vibrator 10 and the bracket 34 are reduced, and the air resistance decreases as much as the air gaps have been reduced when the vibrator 10 moves in either direction. As a result, an adverse effect of the air resistance according to the air gap on the vibration characteristics of the vibrator 10 is greatly reduced.

In a non-operational state of the vibrator 10 as shown in FIG. 8, more specifically, at an initial neutral position (power not applied) of the vibrator 10 in which the elasticity of the first spring 40L and the second spring 40R is balanced, a distance D1 between the movable stoppers 44L and 44R and the fixed stoppers 35 and 36 corresponding to the movable stoppers 44L and 44R may be set to be smaller than at least a shortest distance D2 between the coil-yoke unit 21 and the weighted bodies 16L or 16R.

In a state of non-application of the power, wherein the elasticity of the first and second springs 40L and 40R are balanced, when the distance D1 between the movable stoppers 44L and 44R and the fixed stoppers 35 and 36 corresponding to the movable stoppers 44L and 44R is set to be smaller than at least the shortest distance D2 between the coil-yoke unit 21 and the weight 16L or 16R, a direct collision between the vibrator 10 and the coil-yoke unit 21 is prevented even when the vibrator 10 is over-stroked due to a drop impact and the like.

Figure 9:
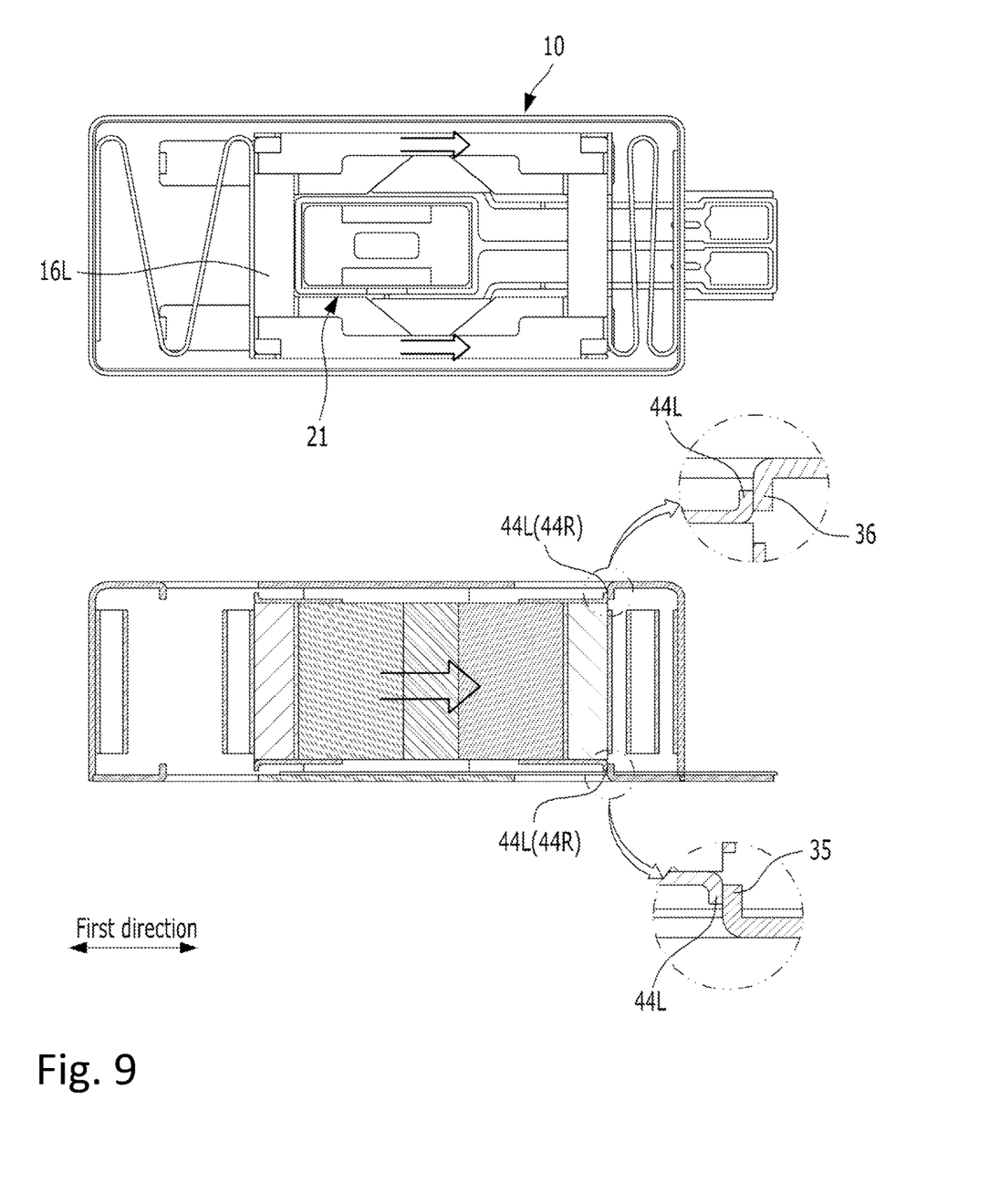
FIG. 9 shows views showing operation state diagrams of the present disclosure for explaining the movement restriction of the vibrator by the movable stopper and the fixed stopper, respectively.

That is, even when the vibrator 10 is excessively moved in either direction out of a vibration section of the normal range due to a drop impact and the like, as in operation state diagrams of FIG. 9, the movable stoppers 44L and 44R located in the direction in which the vibrator 10 moved reach first the corresponding fixed stoppers 35 and 36 before the weighted body 16L of one side of the vibrator 10 collides with the coil-yoke unit 21, thereby being unable to move anymore. Therefore, a direct collision between the vibrator 10 and the coil-yoke unit 21 does not occur.

Figure 10:
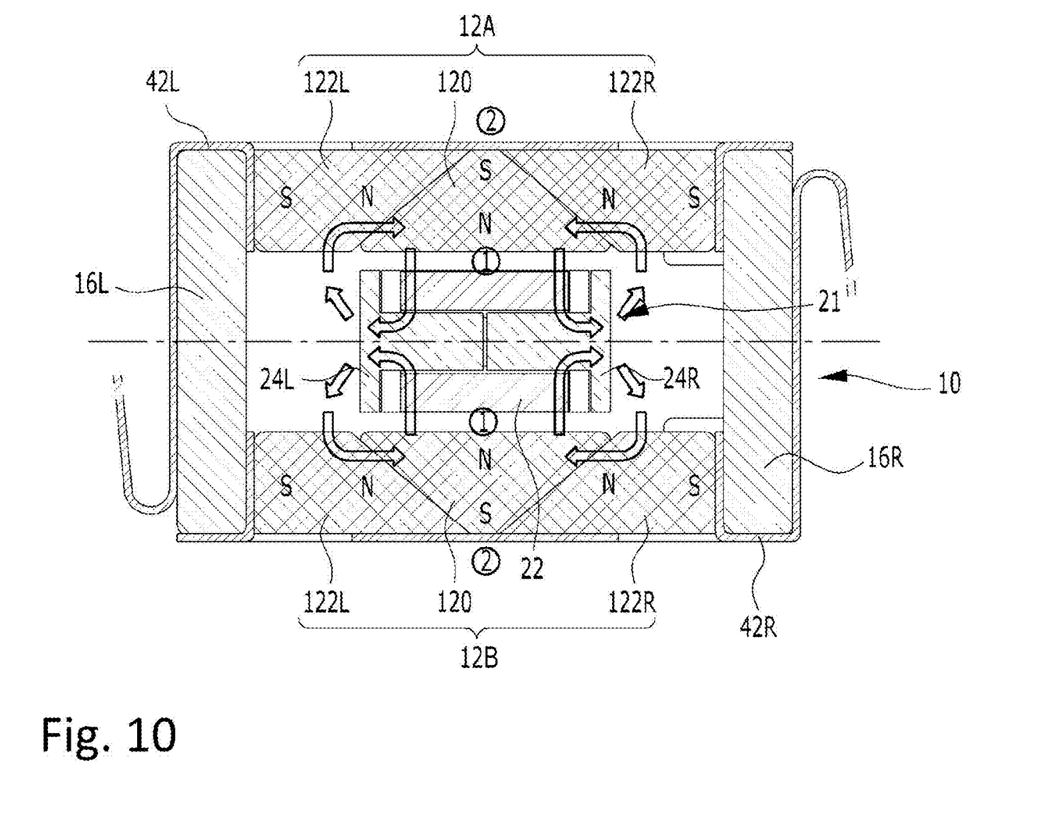
FIG. 10 is a view showing an exemplary embodiment of a magnetic circuit composed of a magnet of the vibrator and a coil-yoke unit that is a stator.

FIG. 10 is a view showing a magnetic circuit of a horizontal linear-vibration generating apparatus composed of a magnet of a vibrator and a coil-yoke unit as a stator according to an embodiment of the present disclosure.

With reference to FIG. 10, the two magnets 12A and 12B constituting the vibrator 10 include, respectively, one central magnet 120 and a pair of auxiliary magnets 122L and 122R installed at, by being in contact with, opposite sides of the central magnet 120. In this case, magnetic pole surfaces 121 that the pair of auxiliary magnets 122L and 122R disposed in contact with the opposite sides of the one central magnet 120, respectively, and the central magnet 120 contact with each other may each have an inclined configuration.

The central magnet 120 of the first magnet 12A and the central magnet 120 of the second magnet 12B each have an N pole on one side closer to the coil-yoke unit 21 and an S pole on an opposite side farther from the coil-yoke unit 21. In addition, the pair of auxiliary magnets 122L and 122R contacted with the opposite sides of each of the central magnets 120 each have an N pole located on a side in contact with the central magnet 120 (the side close to the magnetic pole surface 121) and an S pole located on the side far from the central magnets 120.

As illustrated in the drawing, the central magnet 120 may be provided in a shape of an isosceles triangle or an isosceles trapezoid, so a distance between corresponding two portions, each being equally apart from the coil-yoke unit 21, of the pair of magnetic pole surfaces 121, narrows gradually as a distance of each of the two portions from the coil-yoke unit increases, wherein the pair of magnetic pole surfaces 121 are provided by the auxiliary magnets 122L and 122R respectively in contact with opposite sides of the central magnet 120.

When the magnetic field of the central magnet 120 is directed toward the stator, and the magnetic fields of the auxiliary magnets 122L and 122R are arranged to be directed toward the central magnet 120, an effect of the central magnet 120 pushing the magnetic flux of the auxiliary magnets 122L and 122R toward a coil side is revealed. Accordingly, the magnetic flux density of one side of each of the first and second magnets 12A and 12B (the side facing the coil-yoke unit 21) is increased, and the magnetic flux density of an opposite side of each of the first and second magnets 12A and 12B is relatively decreased.

That is, due to a Halbach array in which the magnetic field direction of the central magnet 120 faces the coil and the magnetic field direction of each of the auxiliary magnets 122L and 122R faces the central magnet 120, the magnetic flux density in a region ② opposite to the coil-yoke unit 21 is canceled out by the mutual interference effect between the magnetic force lines according to the Halbach array, thereby being greatly reduced, and on the contrary, the magnetic flux density in a region ① facing the coil-yoke unit 21 is increased.

As a result, a strength of the magnetic force in the region ① substantially generating the vibration force through interaction with the coil-yoke unit 21 is increased, and the driving force according to the interaction between the increased magnetic force and magnetomotive force of the coil-yoke unit 21 is increased, whereby the suction and repulsion of the vibrator 10 with respect to the stator 20 and propulsion are improved. As a result, the vibration force is increased and the reaction speed (responsiveness) is increased.

According to the above embodiment of the present disclosure, the stoppers are configured by effectively utilizing some parts of the vibrator and some parts of the stator, whereby problems caused by constructing the stoppers with separate parts as in the past (increase in the number of parts, decrease in mass production of a product, increase in production cost of a product, decrease in space utilization, a problem difficult to implement an apparatus with a compact size, and the like) may be solved.

In addition, configurations (spring feet) capable of mounting weighted bodies and magnets are integrally added to elastic bodies (springs), respectively, so the use of separate parts such as a conventional frame for connecting the weighted bodies and the magnets to the elastic bodies may be eliminated. Accordingly, product miniaturization and productivity improvement may be promoted, and the production cost may be lowered as much as the use of separate parts is excluded, thereby securing price competitiveness.

In addition, the configurations (spring feet) configured to mount the vibrator are integrally provided on the elastic bodies (springs), respectively, so there are advantages in that the bonding force between the elastic bodies and the vibrator is further increased, and a durability problem of a related art due to welding the elastic bodies and the vibrator can also be clearly solved.

In addition, even when the vibrator is over-stroked by the drop impact and the like, a direct collision between the vibrator and the coil-yoke unit is prevented by a pair of stoppers, so it is possible to fundamentally prevent abnormal noises and vibrations caused by a collision between parts (vibrator and coil-yoke unit) due to the drop impact and the like and damage to a key component (for example, coil-yoke unit) constituting the apparatus.

In addition, some parts of the spring feet and some parts of a case and a bracket are bent to face each other so as to provide movable stoppers and fixed stoppers, so an air gap between the vibrator and case and an air gap between the vibrator and bracket are reduced, and as the air gaps are reduced, when the vibrator moves in one direction, the air resistance is reduced. As a result, the influence of the air resistance caused by the air gaps on the vibration characteristics of the vibrator can be greatly reduced.

In addition, the present disclosure has advantages: the first and second magnets are structures respectively facing the opposite side surfaces of the stator and receiving the force, so the section from which the vibrator receives the force is provided long to make the vibration characteristics be exhibited well; and due to the magnetic circuit characteristics (characteristics that the magnetic force of the side facing the coil is increased) according to a unique arrangement of the permanent magnets, larger vibrations may be generated and the reaction speed (responsiveness) is also fast.

In the above detailed description of the present disclosure, only specific embodiments thereof have been described. However, it should be understood that the present disclosure is not limited to the particular form recited in the detailed description, but it is rather to be understood to cover all modifications, equivalents, and substitutions falling within the spirit and scope of the present disclosure as defined by the appended claims.

The invention claimed is:

1. A horizontal linear-vibration generating apparatus, the apparatus comprising:
   a case coupled to a bracket to provide mounting space therein;
   a stator mounted in the mounting space and including a coil-yoke unit electrically connected to a circuit substrate on the bracket;
   a vibrator having magnets corresponding to the coil-yoke unit and weighted bodies configured to amplify vibration and vibrating in a first direction with respect to the stator in the mounting space; and
   first and second springs correspondingly provided between the case and the vibrator and elastically supporting a shaking motion of the vibrator in the first direction with respect to the stator in the mounting space, at opposite sides of the vibrator,
   wherein the first and second springs are integrally provided with first and second spring feet, respectively, for mounting the vibrator,
   the first and second spring feet each have at least one movable stopper,
   the case and the bracket each have at least one fixed stopper provided in correspondence to the movable stopper, and
   the movable stopper and the fixed stopper corresponding to each other have at least portions overlapped when viewed in the first direction, and
   wherein the first and second weighted bodies installed to face each other in the first direction with the coil-yoke unit interposed therebetween; and the first and second magnets installed to face each other in a second direction orthogonal to the first direction with the coil-yoke unit interposed therebetween, and
   wherein the first spring foot is mounted with a first weighted body and a first magnet, thereon, and the second spring foot is mounted with a second weighted body and a second magnet, thereon and
   in order for the first magnet and the second magnet not to be breakaway in the first direction during the vibration, the first spring foot and the second spring foot are each provided with the pair of separation prevention pieces,
   wherein the pair of separation prevention pieces is provided by cutting some parts of a magnet mounting plate of each of the first spring foot and the second spring foot and bending the cut-out portions in a direction in which the magnet is mounted.

2. The apparatus of claim 1, wherein the first and second magnets each comprise:
   one central magnet; and
   a pair of auxiliary magnets installed to be in contact with and at opposite sides of the central magnet, wherein the central magnet of the first magnet and the central magnet of the second magnet each have an N pole on one side close to the coil-yoke unit and an S pole on an opposite side far from the coil-yoke unit, the pair of auxiliary magnets installed to be in contact with and at opposite sides of each central magnet is each provided such that a side in contact with the central magnet is an N pole and a side far from the central magnet is an S pole, and magnetic pole surfaces where the pair of auxiliary magnets disposed in contact with the opposite sides of the one central magnet, and the central magnet are brought in contact with each other are each inclined.

3. The apparatus of claim 1, wherein at an initial neutral position of the vibrator in which the elasticity of the first spring and the second spring is balanced, a distance between the movable stoppers and the fixed stoppers corresponding to the movable stoppers is smaller than at least a shortest distance between the coil-yoke unit and the weighted bodies.

4. A horizontal linear-vibration generating apparatus, the apparatus comprising:
- a case coupled to a bracket so as to provide mounting space therein;
- a stator mounted in the mounting space and including a coil-yoke unit electrically connected to a circuit substrate on the bracket;
- a vibrator having magnets corresponding to the coil-yoke unit and weighted bodies configured to amplify vibration and vibrating in a first direction with respect to the stator in the mounting space; and
- first and second springs correspondingly provided between the case and the vibrator and elastically supporting a shaking motion of the vibrator in the first direction with respect to the stator in the mounting space, at opposite sides of the vibrator,
- wherein the first and second springs are integrally provided with first and second spring feet, respectively, for mounting the vibrator,
- the first and second spring feet each have at least one movable stopper,
- the case and the bracket each have at least one fixed stopper provided in correspondence to the movable stopper, and
- the movable stopper and the fixed stopper corresponding to each other have at least portions overlapped when viewed in the first direction, and wherein the first and second weighted bodies installed to face each other in the first direction with the coil-yoke unit interposed therebetween; and the first and second magnets installed to face each other in a second direction orthogonal to the first direction with the coil-yoke unit interposed therebetween, and wherein the first spring foot is mounted with a first weighted body and a first magnet, thereon, and the second spring foot is mounted with a second weighted body and a second magnet, thereon and in order for the first magnet and the second magnet not to be breakaway in the first direction during the vibration, the first spring foot and the second spring foot are each provided with a pair of separation prevention pieces, wherein the pair of separation prevention pieces is provided such that some parts of each of an upper side plate and a lower side plate of each of the first and second spring feet are cut, and cut-out portions are bent in a direction in which the magnet is mounted.

5. The apparatus of claim 4, wherein the first and second magnets each comprise:
- one central magnet; and
- a pair of auxiliary magnets installed to be in contact with and at opposite sides of the central magnet,
- wherein the central magnet of the first magnet and the central magnet of the second magnet each have an N pole on one side close to the coil-yoke unit and an S pole on an opposite side far from the coil-yoke unit,
- the pair of auxiliary magnets installed to be in contact with and at opposite sides of each central magnet is each provided such that a side in contact with the central magnet is an N pole and a side far from the central magnet is an S pole, and
- magnetic pole surfaces where the pair of auxiliary magnets disposed in contact with the opposite sides of the one central magnet, and the central magnet are brought in contact with each other are each inclined.

6. The apparatus of claim 4, wherein at an initial neutral position of the vibrator in which the elasticity of the first spring and the second spring is balanced, a distance between the movable stoppers and the fixed stoppers corresponding to the movable stoppers is smaller than at least a shortest distance between the coil-yoke unit and the weighted bodies.

* * * * *